(12) United States Patent
Giles et al.

(10) Patent No.: US 6,437,812 B1
(45) Date of Patent: Aug. 20, 2002

(54) GRAPHICAL USER INTERFACE AND METHOD FOR DISPLAYING HIERARCHICALLY STRUCTURED INFORMATION

(75) Inventors: David Peter Giles, Harlow; Lisa Anne Tweedie, Maidenhead; Graham John Jolliffe, Great Dunmow; Jonathan Coward, Radwinter; Alexander Bushell, Harlow; Philip W Hobson, Bishop's Stortford, all of (GB)

(73) Assignee: Cerebrus Solutions Limited, Essex (GB)

( * ) Notice: Subject to any disclaimer, the term of this patent is extended or adjusted under 35 U.S.C. 154(b) by 0 days.

(21) Appl. No.: 09/345,068

(22) Filed: Jun. 30, 1999

(51) Int. Cl.[7] .................................................. G06F 3/00
(52) U.S. Cl. ...................... 345/853; 345/854; 345/855
(58) Field of Search ................................ 345/764, 810, 345/841, 843, 845, 853, 854, 855, 828

(56) References Cited

U.S. PATENT DOCUMENTS

| | | | | |
|---|---|---|---|---|
| 5,065,347 A | * | 11/1991 | Pajak et al. .................. | 345/853 |
| 6,111,578 A | * | 8/2000 | Tesler .......................... | 345/850 |
| 6,163,604 A | * | 12/2000 | Baulier et al. ............... | 379/189 |
| 6,191,786 B1 | * | 2/2001 | Eyzaguirre et al. ......... | 345/853 |
| 6,285,366 B1 | * | 9/2001 | Ng et al. ..................... | 345/853 |
| 6,037,926 A1 | * | 10/2001 | Barton et al. ............... | 379/189 |

OTHER PUBLICATIONS

Extract from SuperSleuth Version 2.2 User Guide, Nortel Networks Sep. 1998.

Cowart, Robert; Mastering Windows 3.1; 1993; SYBEX Inc; pp. 24–30.*

* cited by examiner

Primary Examiner—John Cabeca
Assistant Examiner—Kieu D. Vu
(74) Attorney, Agent, or Firm—Kevin A. Oliver; Foley Hoag LLP

(57) ABSTRACT

A graphical user interface (GUI) is described which enables hierarchically structured information to be presented and analysed by a user quickly and easily. In one example, the GUI is for a fraud management system and the information is about "alarms". Each alarm is an indicator of potential fraud and several types of alarm are presented, where the type of an alarm depends on the method of obtaining that alarm. The types of alarm are arranged in a hierarchical structure and a representation of the hierarchical structure is displayed on a display screen. A user is able to select one or more parts of the hierarchical structure in order to display information about all the alarms of the selected types and subtypes. This enables the user to quickly and easily view required information without the need to make many user actions and selections. The representation of the hierarchical structure may be tailored by the user. This is done by collapsing or expanding parts of the hierarchical representation.

48 Claims, 11 Drawing Sheets

GRAPHICAL USER INTERFACE AND METHOD FOR DISPLAYING HIERARCHICALLY STRUCTURED INFORMATION

BACKGROUND OF THE INVENTION

1. Field of the Invention

This invention relates to a graphical user interface (GUI) and in particular, but not limited to a GUI for a fraud management system.

2. Description of the Prior Art

A GUI provides a means by which a user can control an apparatus such as a computer system. The GUI is typically also the means by which information about or from the apparatus is presented to the user.

A particular problem for GUIs involves providing an interface which can present large amounts of information to a user in such a way that the user can quickly and easily obtain the required information. The GUI should be easy to learn and flexible in order that a user may "tailor" displays to meet particular requirements. These problems occur particularly where the information to be presented is of several types which can be organised into a hierarchical structure.

The GUIs provided as part of Microsoft Outlook™ and Microsoft Windows Explorer™ have attempted to address these problems by presenting displays which illustrate the hierarchical structure of stored information. For example, in Microsoft Windows Explorer a display of icons is presented in a "tree" structure form where the leaves of the tree represent individual documents and branches of the tree represent folders for containing documents. However, when a user selects an icon representing a branch of the tree, information about each leaf of the tree stemming from that branch is not necessarily presented. In order for the user to view information about all documents at that level and below in the hierarchy several key presses or other user actions are required. This is time consuming and repetitive for the user and can lead to novice users being unable to find the information that they require. A similar problem is encountered with Microsoft Outlook.

Fraud management systems are typically used to analyse data about events such as credit card transactions or telephone calls, in order to detect potentially fraudulent events. These potentially fraudulent events are identified for example using rule based methods, neural networks, or other suitable techniques. Often a combination of different techniques are used and the results compared. This leads to the situation where a given event may be detected as potentially fraudulent using several different methods within a fraud management system and several different "alarms" or "alerts" are raised to notify an operator of the fraud management system. Several tens of different methods may be used to identify potentially fraudulent events especially for telecoms fraud. For example, particular situations may be identified as potentially fraudulent such as if the total cost of calls rapidly increases on a particular customer account, or if simultaneous calls occur from the same customer account (this is not possible under normal circumstances). This means that the number of types of "alarms" or "alerts" is great. As well as this the number of instances of alarms can be large especially because telecoms fraud such as mobile telephone fraud is a growing problem.

The operator of a fraud management system is thus provided with many "alarms" as outputs from the system and needs to analyse these and decide what action to take. For example, one or more "alarmed" events such as telephone calls may be related in that they are all calls to the same destinations, or are all calls to one another. Once an account that is being used fraudulently has been identified the owner, who may well be aware of this, is typically contacted and provided with a new account. Once a fraudulent account has been identified action needs to be taken quickly in order to minimise any losses incurred.

It is therefore important for a GUI to be provided to a fraud management system which is simple and easy to use and yet which is able to provide a user with all the functionality he requires. Before now, such GUIs for fraud management systems have not been able to cope well with the large number of potential "alarms" and the large number of types of alarms. Typically a user has had to move or change between different windows or displays within a GUI in order to seek all the information he requires. This is time consuming and complex making such GUIs difficult to learn especially for novices in the field of fraud management systems. Another problem with known GUIs for fraud management is that they are inflexible and cannot easily be used by an operator to provide a display tailored for a particular task or situation. Also, different types of alarm have been treated differently and this has meant that a user has had to make several "clicks" or selections in order to reach the information required.

It is accordingly an object of the present invention to provide an improved GUI which overcomes or at least mitigates one or more of the problems noted above.

SUMMARY OF THE INVENTION

According to the present invention there is provided a method of controlling a display for displaying hierarchically structured information, the hierarchy having at least two levels, said method comprising the steps of:

(i) displaying a representation of at least part of the hierarchy;

(ii) receiving user input to make a selection of part of the hierarchy, at a given one of the levels in the hierarchy; and (iii) displaying information located within the selected part of the hierarchy including information located two or more levels below the level of the selection, in response to the selection.

A corresponding computer program stored on a computer readable medium is provided, said computer program being for controlling a display for displaying hierarchically structured information, the hierarchy having at least two levels, said computer program being arranged to control said display such that:

(i) a representation of at least part of the hierarchy is displayed;

(ii) a user input is received, to make a selection of part of the hierarchy, at a given one of the levels in the hierarchy; and (iii) information is displayed within the selected part of the hierarchy, including information located two or more levels below the level of the selection, in response to the selection.

A corresponding graphical user interface is provided for controlling a computer system, said graphical user interface comprising:

(i) a display screen;

(ii) a user input means; and (iii) a processor arranged to display hierarchically structured information from the computer system on the display screen, the hierarchy having at least two levels and said processor being arranged to control the display of information on the display screen by:
  (i) displaying a representation of at least part of the hierarchy;
  (ii) receiving a user input to make a selection of part of the hierarchy, at a given one of the levels in the hierarchy; and
  (iii) displaying information located within the selected part of the hierarchy, including information located two or more levels below the level of the selection, in response to the selection.

This provides the advantage that an improved GUI is created. The user is able to quickly and easily select particular parts of hierarchically structured information without needing to make several actions or selections. Use of a hierarchical representation enables the user to gain an overall view of the structure of the items and to select required information from a single display screen. For a given level in the hierarchy all information located two or more levels below that level is presented as a result of a single user action. The resulting GUI is simple to use and easy to learn.

The present invention also provides a fraud management system comprising:
  (i) a display screen;
  (ii) user input means;
  (iii) a processor arranged to display hierarchically structured information from the fraud management system on the display screen, said information comprising a plurality of alarms each alarm being an indicator of potential fraud, said hierarchy having at least two levels, said processor being arranged to control the display of information on the display screen by:
    (i) displaying a representation of at least part of the hierarchy on the display screen;
    (ii) receiving a user input to make a selection of part of the hierarchy at a given one of the levels in the hierarchy; and
    (iii) displaying information located within the selected part of the hierarchy, including information located two or more levels below the level of the selection, in response to the selection.

This provides the advantage that an improved GUI for a fraud management system is created. The user is able to quickly and easily select information about different alarms without needing to make several actions or selections. Use of a hierarchical representation enables the user to gain an overall view of the structure of the alarms and to select required information from a single display screen. For a given level in the hierarchy information located two or more levels below is presented as a result of a single user action. The resulting GUI is simple to use and easy to learn.

According to another aspect of the present invention there is provided a method of operating a display for displaying hierarchically structured information, the hierarchy having at least two levels, said method comprising the steps of:
  (i) causing a representation of at least part of the hierarchy to be displayed;
  (ii) making a user input to select part of the hierarchy at a given one of the levels in the hierarchy; and
  (iii) causing information to be displayed within the selected part of the hierarchy, including information located two or more levels below the level of the selection, in response to the selection.

This enables a user to quickly and easily operate a display in order to obtain information that he or she requires without having to make many user inputs.

Further benefits and advantages of the invention will become apparent from a consideration of the following detailed description given with reference to the accompanying drawings, which specify and show preferred embodiments of the invention.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

The term "alarm" is used to refer to a potentially fraudulent event that has been identified as such by a fraud management system.

The term "fraud management system" is used to refer to any type of automated method that is suitable for analysing information about events and identifying potentially fraudulent events.

The present invention relates to a graphical user interface (GUI). The GUI provides a means by which a user or operator can control a system such as a fraud management system. The GUI is the means through which information is presented to the user and user inputs are made to the fraud management system or other system in order to control it. Any suitable system can be used. For example, the mobile telephone fraud management system described in pending U.S. patent application Ser. Nos. 08/869,884; 08/872,332; and 08/888,361.

Figure 1:
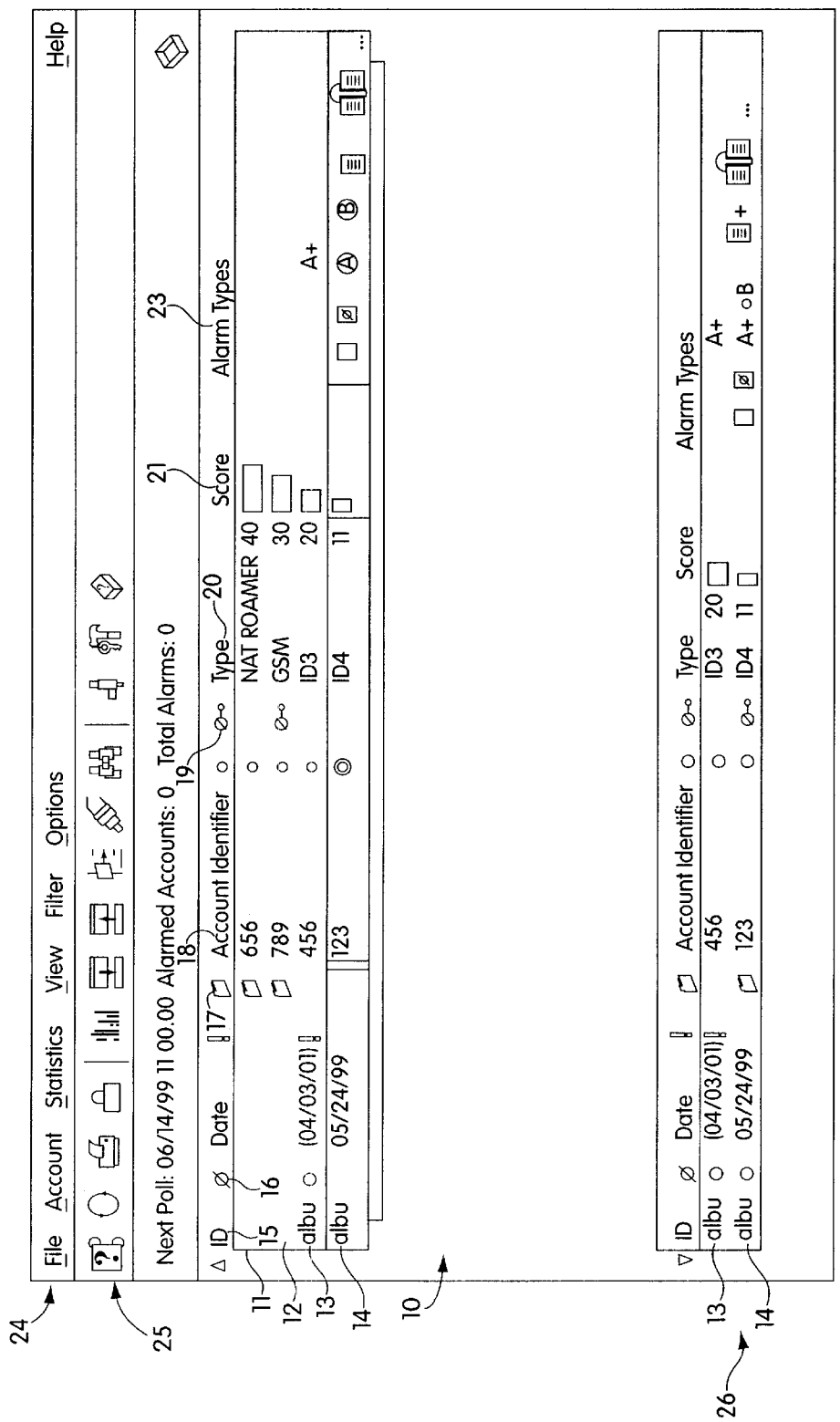
FIG. 1 shows an account manager display screen.
Figure 2:
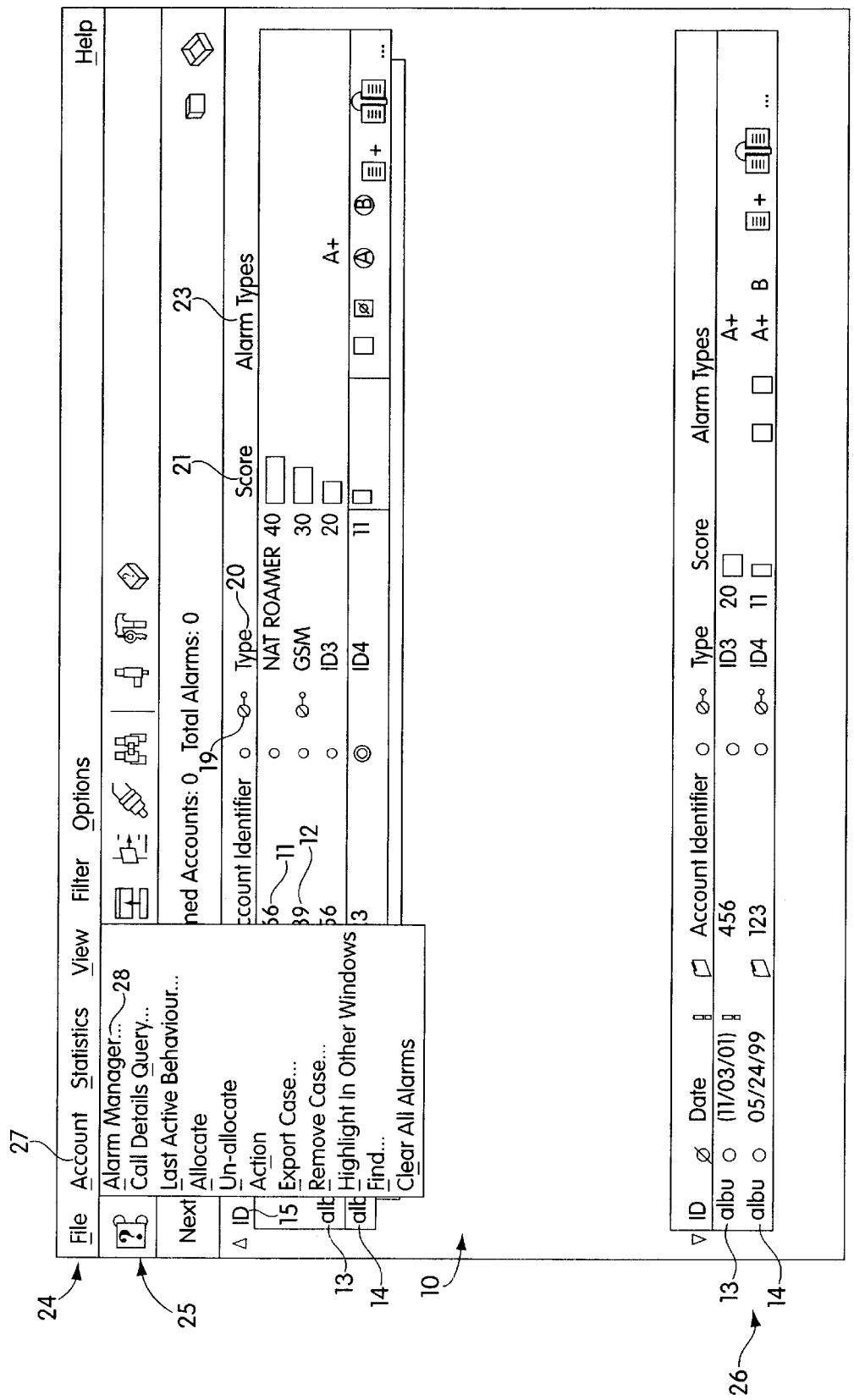
FIG. 2 shows the account manager display screen with an account menu pulled down.

FIGS. 1 to 10 are examples of display screens produced by a GUI for use with a fraud management system. FIGS. 1 to 2 are examples of display screens from part of the GUI which is termed an "account manager" and FIGS. 3 to 10 are examples of display screens from another part of the GUI which is termed an "alarm manager".

Account Manager

FIG. 1 shows an account manager display screen 10 which contains a list of four accounts 11, 12, 13, 14 details for an individual account being displayed in one row of a table-like display. Two of these accounts 13, 14 have been allocated to a particular user and this is indicated by the presence of an identifier "albu" in a column 15 labelled "ID". The other accounts 11, 12 have no such entry in the ID column 15 and have not yet been allocated to a particular user. Once an account has been allocated to a particular user, other users are not able to modify the records for this account.

The next column 16 contains an icon the colour of which indicates whether the particular account has been verified as fraudulent or not and a date column contains information about the date on which any verification information was entered into the fraud management system.

Another column 17 contains an icon which looks similar to a case or folder. This indicates whether a case history is being stored for the particular account by the fraud management system.

For each account, an account identifier is displayed in column 18. The account identifier is a three digit number or any other suitable identifier, for example, which may be non-numeric.

An icon 19 is used to indicated that a potential roamer (which is an indicator of a type of fraudulent activity) has been detected and the type of account is given in another column 20. For example, a particular account may be a business account or an account for a GSM phone.

A score is also given in column 21. This provides an indication of priority and helps operators of the fraud management system to decide which cases to take action for first. For each account, icons are provided to indicate which types of alarm were detected for that account. These icons are located under the "alarm types" column 23.

At the top of the display a menu bar 24 is provided together with a so called "tool bar" or bar of icons 25.

Once a user has deleted all alarms for a particular account, information about that account on the account manager display screen 10 is given in dotted text rather than solid text. Once the screed is "refreshed" this dotted text is remove. For example, see row 13. Also, a second table 26 or list of accounts is provided towards the bottom of the display 10. This contains details of the accounts allocated to a particular user, for example "albu" in the example shown in FIG. 1. It is not essential to provide a second table 26, but this is useful, especially when several users are working using the account management display from separate terminals of a networked computer system. Each particular user is then provided with their own "working area" each of which are formed by a second table 26.

The FILTER menu can be used from menu bar 24 in order to filter out all accounts of a certain type or age and then the remaining accounts are displayed in the first table-like display. The format of the second table 26 is the same as for the first table and is placed below but in register with the first table for ease of comparison.

In order to view further details about an individual account that account is selected using a "mouse", keyboard or other selection means as is known in the art. For example, in FIG. 2, account 14 has been selected and is shaded in colour as compared to accounts 11 to 13. The ACCOUNT menu from menu bar 24 may then be selected, as shown in FIG. 2, and the command ALARM MANAGER activated. This results in an alarm manager display screen being displayed as well as the account manager display 10.

Instead of using the ACCOUNT menu in this way to open the alarm manager display, the user is also able to double click or select account 14 in any other suitable way in order to achieve the same effect.

Alarm Manager

Figure 3:
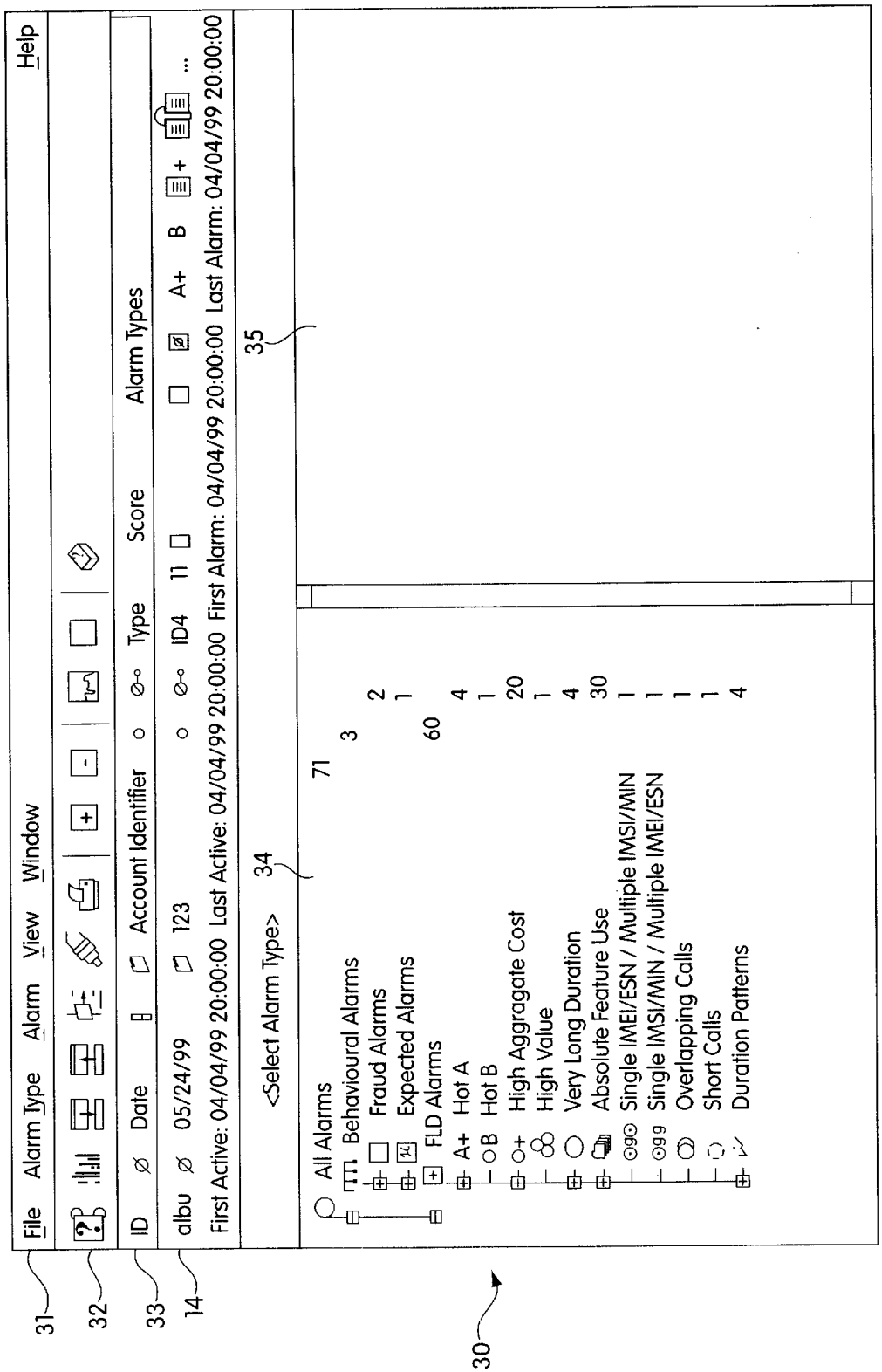
FIG. 3 shows an alarm manager display screen.

FIG. 3 shows an example of an alarm manager display screen 30. This has a menu bar 31 and a toolbar 32 similar to those of the account manager display screen 10. The column headings 33 from the list or table of accounts in the account manager display is given, together with the information about the selected account 14 from the account manager window. This acts as a reference for the user to enable him or her to quickly identify the account being analysed. Details of when the account was first active, when it was last active and when the first and last alarms were shown for it are also given in the display.

The remaining part of the display is divided into two portions or columns 34, 35. One column 35 is shown empty in FIG. 3 and is for displaying information about individual "alarms". The other column 34 contains a display in the form of a tree structure or other hierarchical structure. This displays a number of icons, for different types of alarm and connects these together in a hierarchical fashion. A different icon is used for each type of alarm. At the base of the tree structure is an icon labelled ALL ALARMS and opposite this a figure is displayed which indicates the total number of alarms for the account 14 being analysed.

As discussed above, an alarm is a potentially fraudulent event that has been identified as such by the fraud management system. There are several different types of alarm according to the method used to identify the potentially fraudulent event. For example, potentially fraudulent events identified by a neural network based method as termed "behavioural alarms" in the example being discussed and potentially fraudulent events identified by other methods are termed "first line defence" alarms. Thus for a given event, several different alarms may be generated of different types.

A hierarchy of alarms is formed by allocating some types of alarms as being subtypes. For example, by creating the type "behavioural alarms" all types of alarms which result from analysis by a neural network based method become subtypes of the "behavioural alarm" type; each of these subtypes then has supertype which is the type "behavioural alarm". Various different forms of hierarchy can be formed with subtypes being members of one or more supertypes for example. The subtypes and supertypes form different levels in the hierarchy and individual alarms which are contained within a type comprise information within that type or level of the hierarchy. Thus a hierarchy with only two levels comprises for example a supertype "behavioural alarms" and its subtype "expected alarms". Within the supertype "behavioural alarms" there may also be a number of alarms which are not members of the type "expected alarms". These alarms comprise information within the "behavioural alarms" level. Within the subtype "expected alarms" there may be one or more individual alarms which comprise information within the "expected alarms" level.

In a preferred embodiment the hierarchy is a tree structure where each subtype has only one direct supertype. Each individual alarm can be thought of as a leaf on this tree.

In the case that the GUI is used for a system other than a fraud management system any items of data that are of different types may be used in place of the alarms. These items of data are then formed into a hierarchy as described above for alarms. Any information that is structured hierarchically can be used.

In previous GUIs for fraud management systems and other systems it has not been possible for users to quickly and easily view details of alarms or other items of different types simultaneously on the same display, or to quickly change views to show different parts of hierarchically structured information. Typically this has involved several successive selection actions by the user which are time consuming, repetitive and difficult to learn by novice users of the GUI.

This problem is addressed in the present invention by provision of a representation of at least part of a hierarchy on a single display and allowing a user to find and present information in the hierarchy by selecting a part or parts of the representation. For example, FIG. 3 shows how a number of icons, connected together to form a "tree", are displayed to represent the hierarchical structure of alarm types.

When a part of the representation is selected, such as an icon representing behavioural alarms, information about all members of the behavioural alarms type, including members of its subtypes is presented. That is, if a branch in the representation of the tree structure is selected by a user, then information about all the alarms which are leaves connected to that branch are displayed. This is described in more detail below. However, it is also possible to arrange the GUI such that when a part of the representation is selected, such as an icon representing behavioural alarms, information about all alarms that are two or more levels below the level of the selection are presented. Similarly, information about alarms that are from multiple different levels below the level of the selection may be presented.

When a branch in the representation of the tree structure is selected by a user information within the selected part of the hierarchy is displayed. The selected part of the hierarchy is the branch and all subtypes and leaves connected to that branch.

Referring again to FIG. 3, connected directly to the ALL ALARMS icon are two branches, one to a BEHAVIOURAL ALARM icon and one to a FIRST LINE DEFENCE (FLD) alarms icon. As before, opposite each icon a figure is displayed which indicates the total number of alarms of the appropriate type that are associated with the account 14 being analysed. In the example given in FIG. 3 there are 3 behavioural alarms and 68 FLD alarms, giving a total of 71 which tallies with the number given next to ALL ALARMS. Next to the BEHAVIOURAL ALARMS icon a small minus sign is given. This indicates that all the branches and leaves of the tree which stem from the BEHAVIOURAL ALARMS icon are currently displayed. In this case these include a FRAUD ALARMS icon and an EXPECTED ALARMS icon. These icons also have numbers adjacent them which sum to give the number of behavioural alarms (i.e. in this case 3).

The small minus sign may be selected by the user, by clicking on it with a mouse for example, in order to collapse this part of the display i.e. to hide the FRAUD ALARMS icon and EXPECTED ALARMS icon. Once these icons are hidden the minus sign changes to a + sign to indicate that some levels of the tree structure are currently hidden from view. For example, next to the fraud alarms icon a + sign is given indicating that there are different types of fraud alarms which can be displayed.

Figure 4:
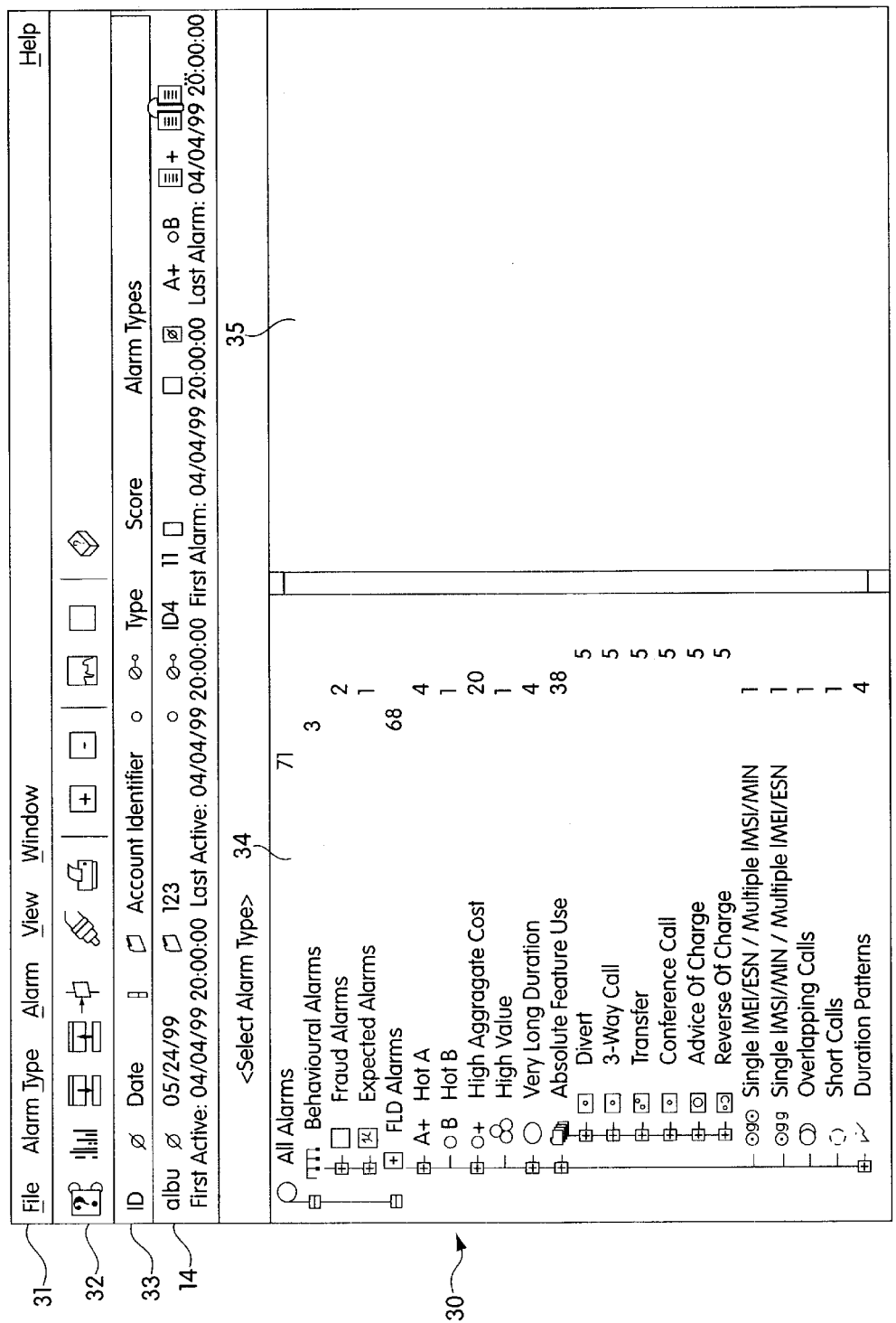
FIG. 4 shows the alarm manager display screen of FIG. 3 with the absolute feature use alarm type expanded.

One of the icons stemming from the FLD alarms icon is an icon labelled ABSOLUTE FEATURE USE. The result of clicking on the + sign next to this icon is illustrated in FIG. 4. Here six further icons are displayed, all stemming from the ABSOLUTE FEATURE USE icon and a minus sign is now given instead of a + sign next to the ABSOLUTE FEATURE USE icon. Apart from this FIG. 4 is the same as FIG. 3.

Thus it is possible for the user to collapse or expand parts of the hierarchical representation in order to tailor that representation to his or her requirements. This aids the user in his or her search for required information. Also, because the hierarchical representation is displayed on a single display screen the user does not need to make repeated actions in order to open new "windows" or change the display show new types of alarms. The user is able to select parts of the hierarchical representation in order to display information about the types of alarms that are required. This reduces the number of selections and actions required by the user in order to display required information; the user is quickly and simply able to view the structure of the alarm types from the hierarchical representation and this simplifies the GUI and makes it easier to use.

Figure 5:
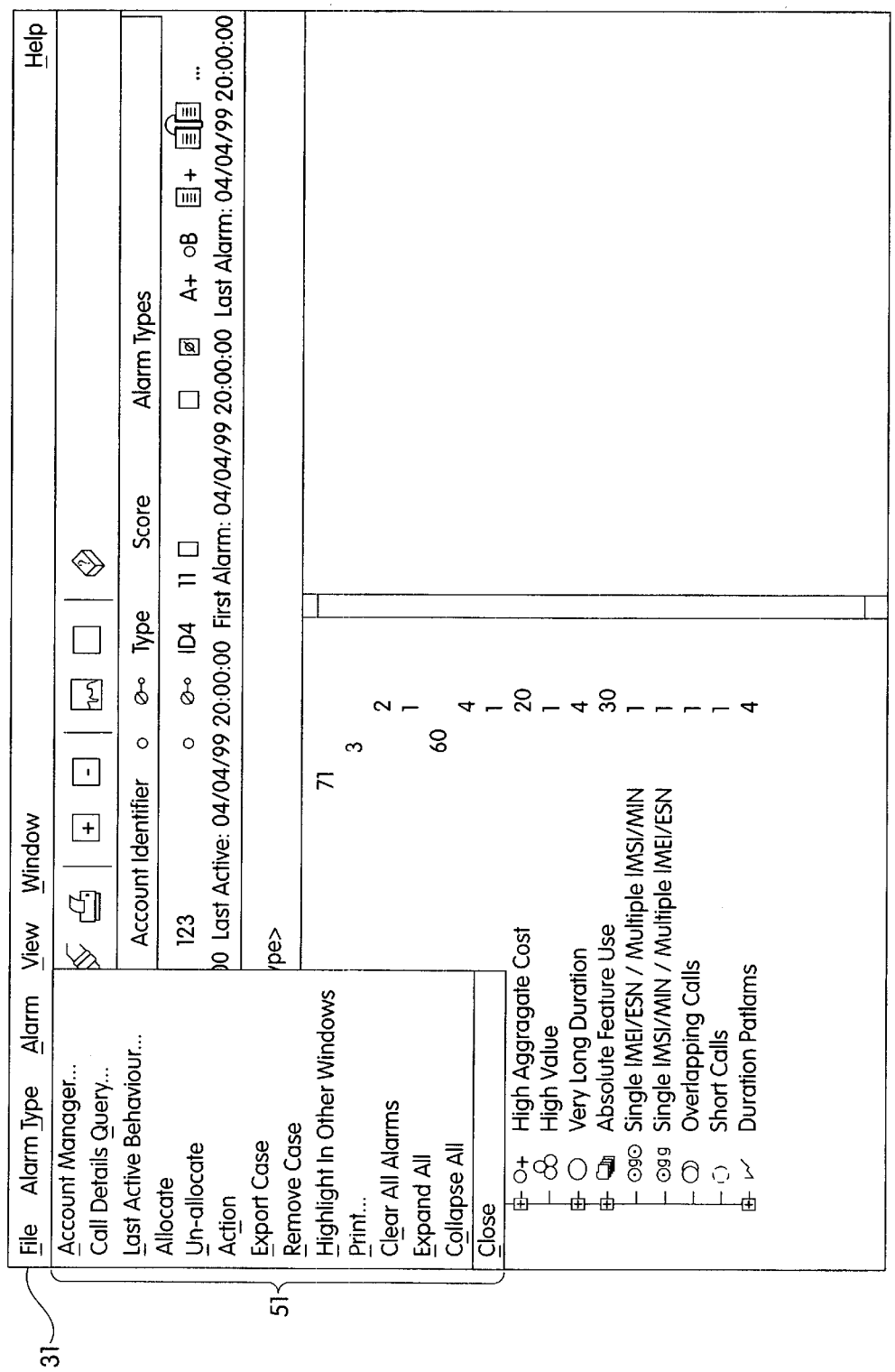
FIG. 5 shows the alarm manager display screen of FIG. 3 with a "file" menu pulled down.

FIG. 5 shows the commands 51 that are available when a file menu is selected from the menu bar 31. These include the following commands:

ACCOUNT MANAGER
CALL DETAILS QUERY
LAST ACTIVE BEHAVIOUR
ALLOCATE
UN-ALLOCATE
ACTION
EXPORT CASE
REMOVE CASE
HIGHLIGHT IN OTHER WINDOWS
PRINT
CLEAR ALL ALARMS
EXPAND ALL
COLLAPSE ALL
CLOSE

Of these the EXPAND ALL and COLLAPSE ALL commands are used to change the hierarchical structure display in a manner so as to show all super and subtypes or to hide all subtypes.

Figure 6:
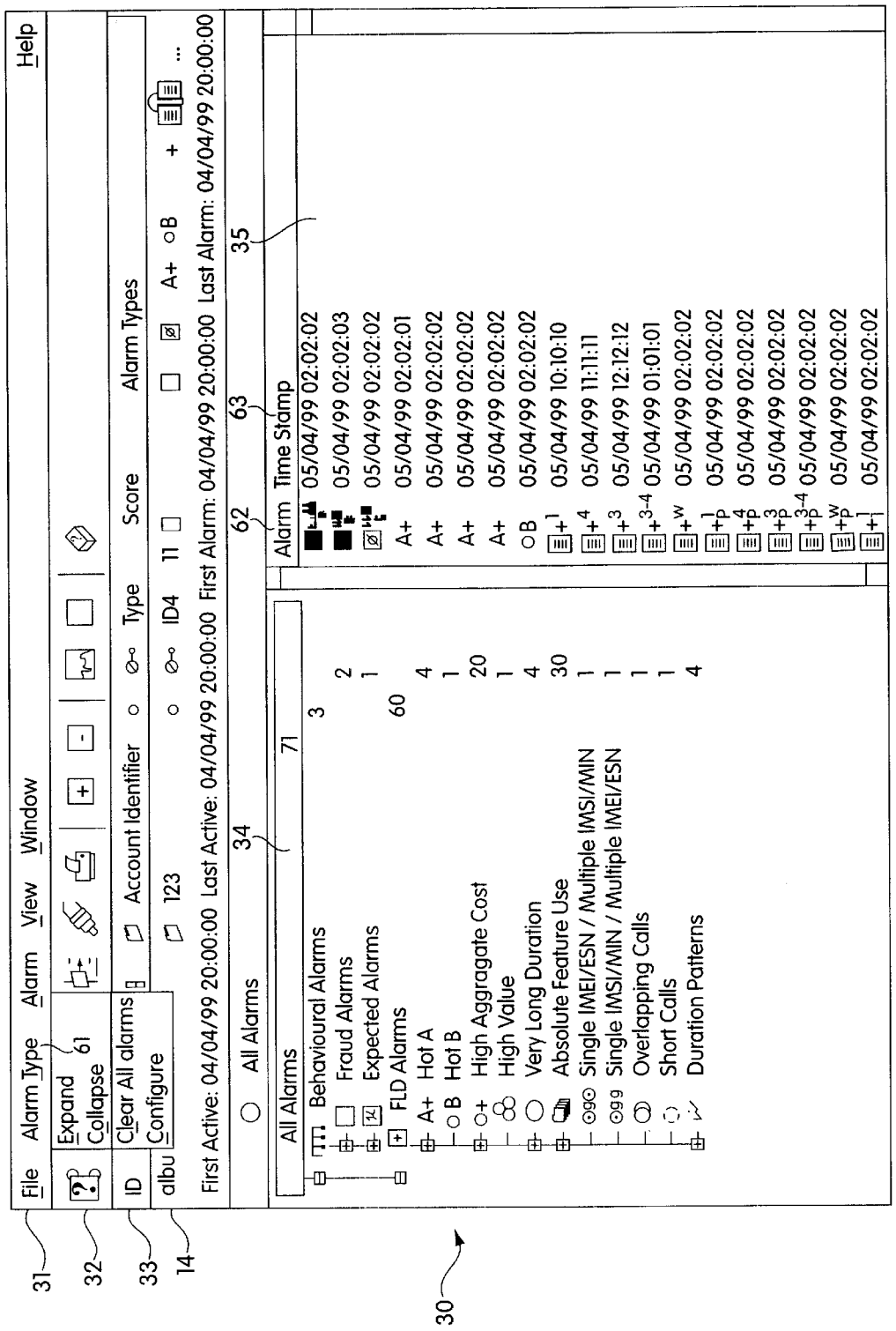
FIG. 6 shows the alarm manager display screen of FIG. 3 with an "alarm type" menu pulled down and "all alarms" selected.

FIG. 6 shows the alarms window when a user has selected the ALL ALARMS icon from the hierarchical representation. Once the user selects this icon, for example, by using a mouse or other suitable input device, then this icon is shaded to indicate that it has been selected. In the example shown in FIG. 6 the display indicates that 71 ALL ALARMS are available for this customer account. Once the ALL ALARMS icon has been selected information about each of these alarms is displayed in the column 35 opposite the hierarchical display. For each alarm, an icon is displayed in a column 62 labelled "ALARM" and these icons indicate the type of each alarm. As well as this, a time stamp is given for each alarm, in another column 63. The time stamp indicates the date and time at which the alarm occurred.

FIG. 6 also shows the result of selecting the ALARM TYPE menu from the menu bar 31. The commands available on this ALARM TYPE menu include: EXPAND, COLLAPSE, CLEAR ALL ALARMS and CONFIGURE.

Figure 7:
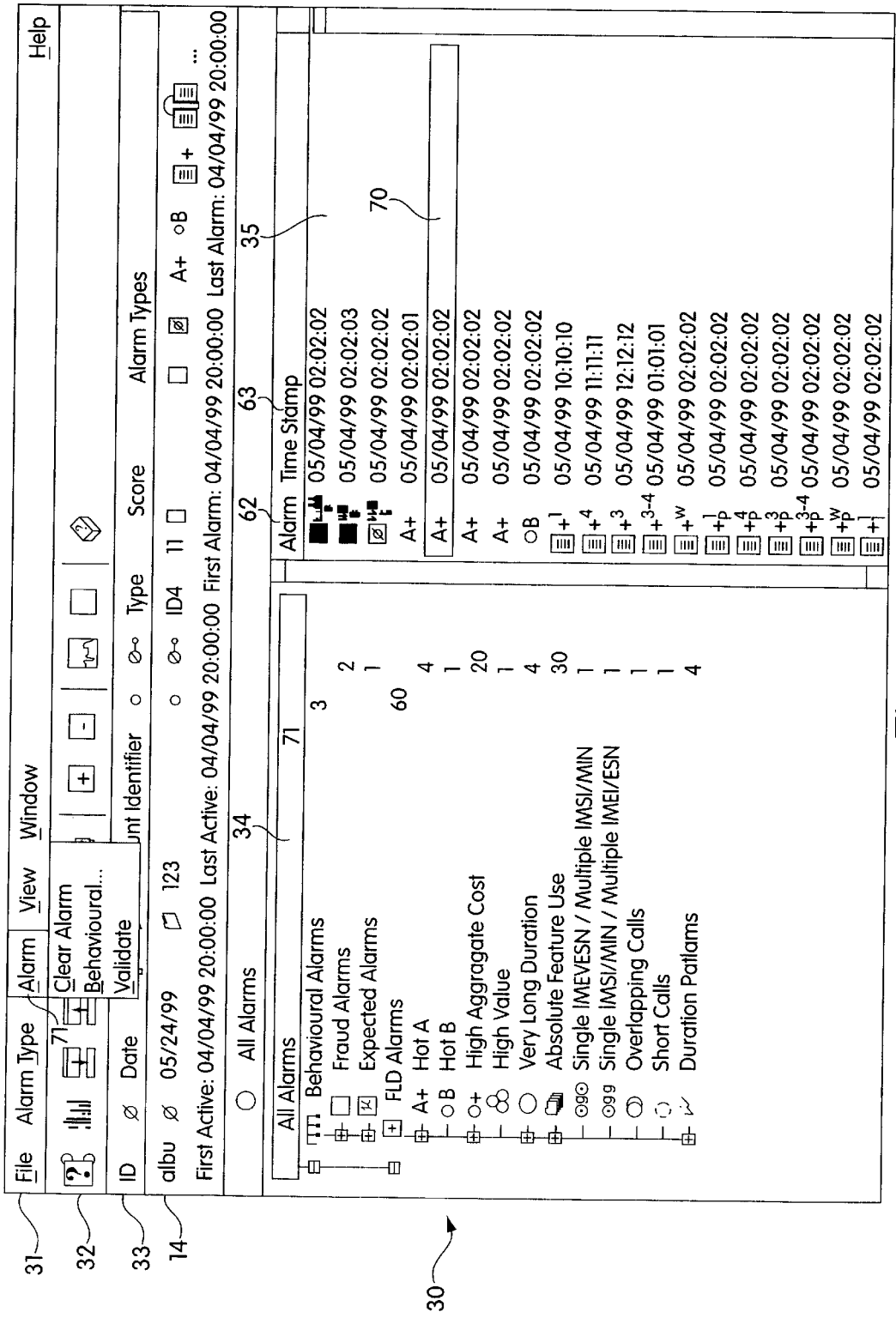
FIG. 7 shows the alarm manager display screen of FIG. 6 with an "alarm" menu pulled down instead of the "alarm type" menu.
Figure 8:
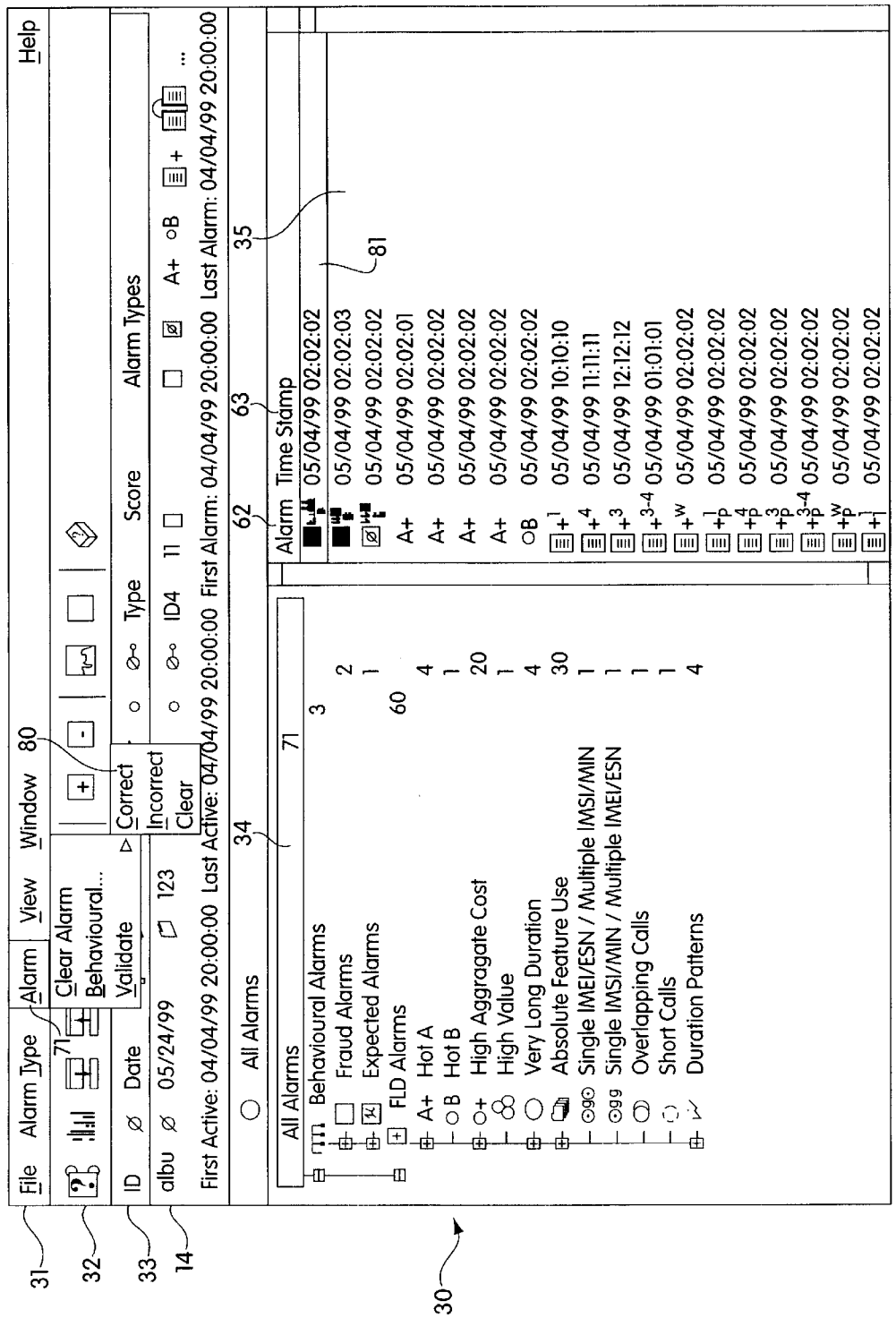
FIG. 8 shows the alarm manager display screen of FIG. 7 with an alarm being validated as correct.

FIG. 7 shows the result of selecting the ALARM menu from menu bar 31. Once a particular alarm is selected in column 35, for example, by the user clicking on an alarm using a mouse, then the ALARM menu can be used to delete or clear this alarm using the command CLEAR ALARM. Similarly the selected alarm can be validated by activating the VALIDATE alarm from the ALARM menu. FIG. 8 shows this in more detail. When the VALIDATE command is chosen, three further options 80 are displayed. The user is able to select one of these options to indicate whether the selected alarm 81 is CORRECT, INCORRECT or whether the validation for that alarm should be cleared (deleted). By choosing the BEHAVIOUR command from the ALARM menu further information is displayed to enable the user to investigate the behaviour of the individual alarm in more detail.

Figure 9:
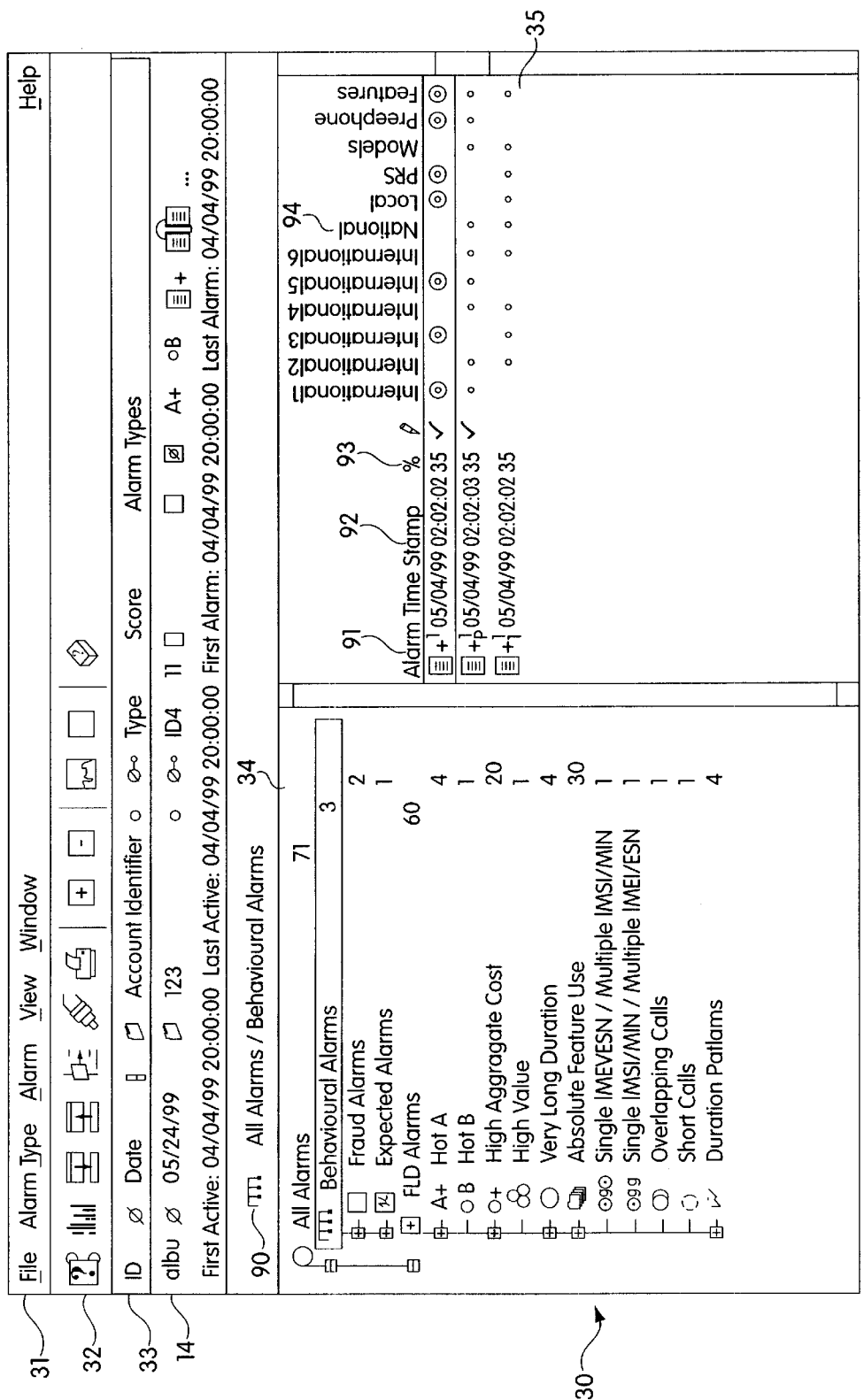
FIG. 9 shows the alarm manager display screen of FIG. 3 with "behavioural alarms" selected.

For each alarm, information about the type of alarm and a time stamp for that are alarm are available. However, for different types of alarm, additional information is available according to the type of alarm. For example, FIG. 9 illustrates the result of selecting the BEHAVIOURAL ALARMS icon from the hierarchical display in column 34. In the example shown in FIG. 9 three BEHAVIOURAL ALARMS are present and information about these is presented in column 35. Information for an individual alarm is presented in a single row of a table-like display. The first column of the table 91 contains icons representing the type of each alarm. The next column 92 gives the time stamps and another column 93 provides a percentage value for each alarm, indicating the amount of certainty that the fraud management system has assigned to that alarm. Several further pieces of information are presented, again in a table-like format 94.

In the case that a supertype is selected from the hierarchical representation, a problem can arise if the information to be presented for the individual alarms of the associated subtypes is of incompatible formats. For example, in the case that ALL ALARMS is selected, as illustrated in FIG. 6, information must be presented about 3 behavioural alarms as well as the first line defence alarms. The behavioural alarms have been obtained from a neural network based fraud detector and the information associated with these alarms is of a different amount, format and type from that from say, the first line defence alarms. However, the display in column 35 needs to present information about both these types of alarms. In order to do this, information which has a common format for all the types of alarms concerned is selected and presented. This provides the advantage that the GUI is able to cope with heterogeneous information about different types of alarms and which has been obtained using different methods.

It is also possible for the user to select more than one part of the hierarchical display at one time. For example, this is required when the user desires to view information about say, "expected alarms" and "overlapping calls alarms". In such a situation, information which has a common format for all the types of alarms concerned is selected and presented in the column 35. In this way the user is effectively able to "mix and match" the types of alarms for which information is presented on a single display screen.

Figure 10:
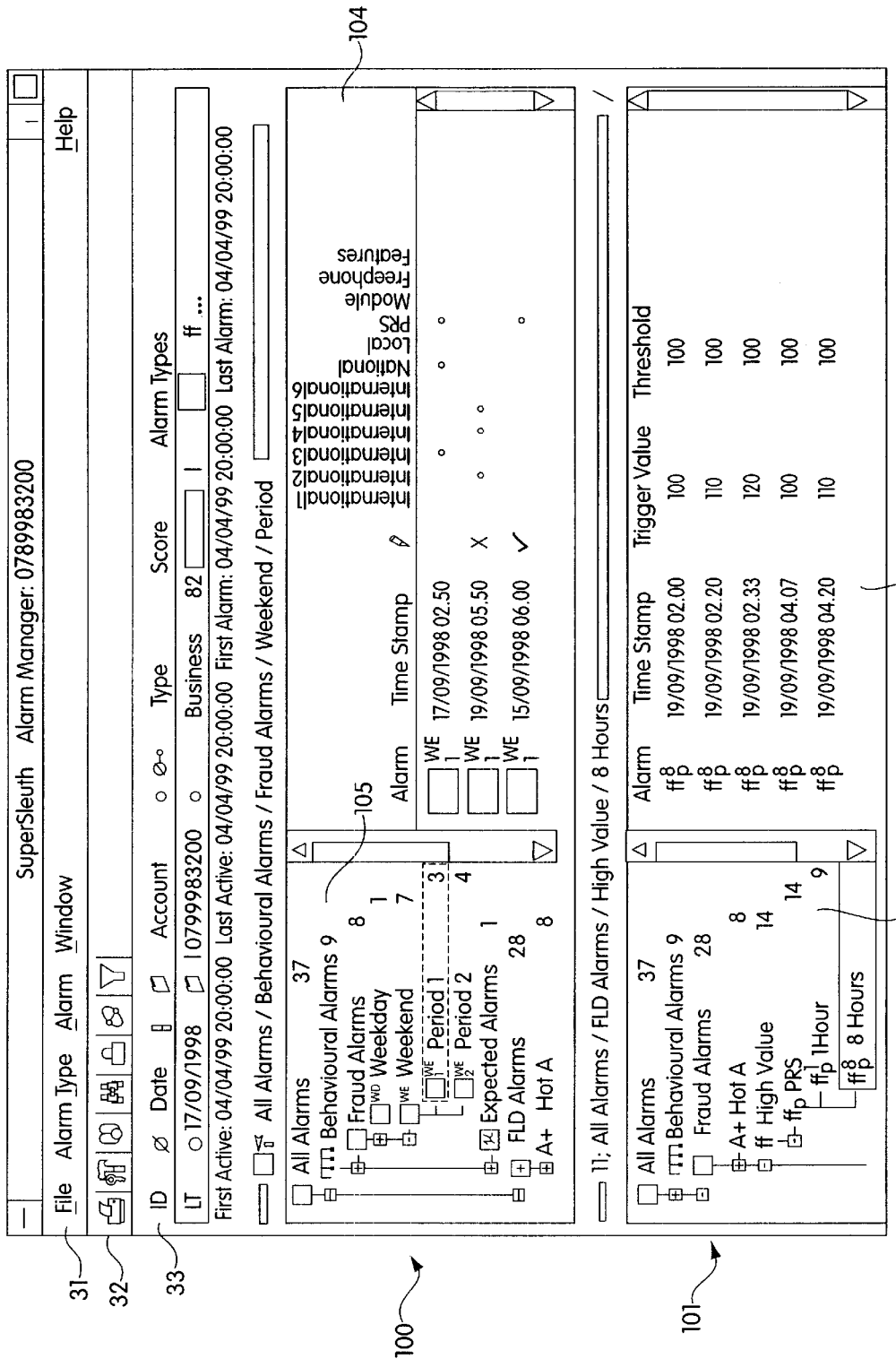
FIG. 10 shows an alarm manager display screen which is split into two parts.

FIG. 10 illustrates the ability to divide or split the display screen into two effectively independent parts or windows 100, 101. In each of these windows two columns are provided 105, 104, 103, 102 so that each window has the same format as the main part of an alarm window 30 in FIG. 9. The display screen may be split into more than two effectively independent parts or windows in a similar way.

In each of the two windows, one of the columns 105, 103 contains a display of the hierarchical structure of alarm types. However, these may be collapsed or expanded independently of one another as a result of user inputs. When part of the hierarchical structure is selected by the user, information about all alarms at that part of the structure or below are displayed in the corresponding other column 104, 102 in the same way as when the display is not split.

As illustrated in FIG. 10 the user may select one type of alarm from the upper window for example, "period 1 fraud alarms" and enable information about these behavioural alarms to be displayed in the upper window. At the same time, the user can select another type of alarm from the lower window, for example, "PRS, 8 hours" and display information about these first level defence alarms in the lower window. In this case the problem of different formats of information between the upper and lower window is avoided and it is possible to present all the information.

The GUI can also be arranged to allow the "mix and match" capability that is described above for both the upper and lower windows.

Figure 12:
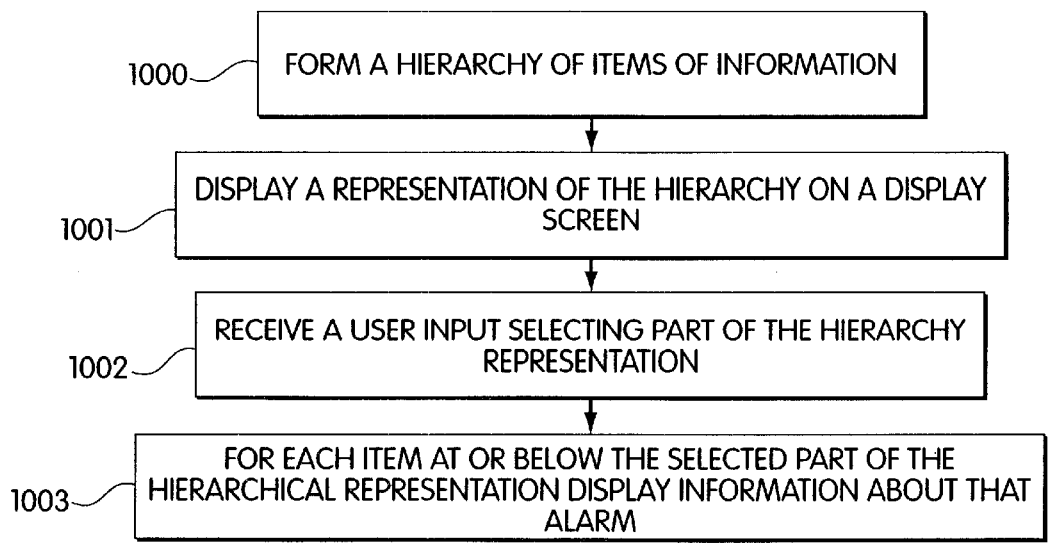
FIG. 12 is a flow diagram of steps for controlling the display of information by a GUI.

The method described above for controlling the display of hierarchically structured information by the GUI is preferably implemented in the form of a computer program using conventional programming techniques as are known in the art. FIG. 12 is a flow diagram of the steps followed by the computer program. These include displaying a representation of at least part of the hierarchy on a display screen (box 1001 of FIG. 12). When a user input is received, selecting part of the hierarchical representation at a given level in the hierarchy (box 1002 of FIG. 12). Then information is displayed, within the selected part of the hierarchy, including information located two or more levels below the level of the selection, in response to the selection (box 1003 of FIG. 12).

Figure 11:
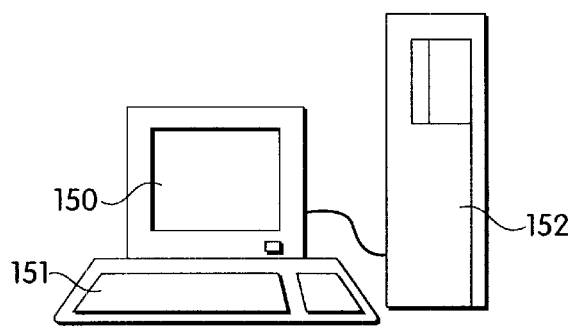
FIG. 11 shows a fraud management system.

FIG. 11 shows a fraud management system comprising:
(i) a display screen 150;
(ii) user input means 151; and
(iii) a processor 152 arranged to display hierarchically structured information from the fraud management system on the display screen, said information comprising a plurality of alarms each alarm being an indicator of potential fraud, said processor being arranged to control the display of information on the display screen by:
   (i) displaying a representation of at least part of the hierarchy on the display screen;
   (ii) receiving a user input to make a selection of part of the hierarchy at a given on eof the levels in the hierarchy; and
   (iii) displaying information within the selected part of the hierarchy, including information located two or more levels below the level of the selection, in response to the selection.

The display screen may be of any suitable type such as a computer screen. The user input device may be a computer mouse, keyboard or other suitable input device as is known in the art. The processor may be a conventional general purpose computer or any suitable information processing apparatus.

A range of applications are within the scope of the invention. These include situations in which it is required to provide a graphical user interface for a fraud management system or other system, and for displaying information in a hierarchical form. Situations where it is required to minimise the number of user actions required to select and display parts of the hierarchical information and also within the scope of the invention.

What is claimed is:
1. A method of displaying hierarchically structured information, the hierarchy having at least two levels, the method comprising:
   (i) displaying a first representation of at least part of the hierarchy;
   (ii) receiving a first user input associated with the first representation to make a first selection of at least part of the hierarchy, at a given one of the levels in the hierarchy;
   (iii) in response to the first selection, displaying information located within the first selected part of the hierarchy, including information located two or more levels below the level of the first selection; and (iv) displaying a second representation of at least part of the hierarchy, the second representation being independent of the first representation, the second representation including at least some information having a different format than information displayed in the first representation.

2. A method as claimed in claim 1 wherein displaying information located within the first selected part of the hierarchy comprises only displaying information of a common format.

3. A method as claimed in claim 1, wherein displaying information located within the first selected part of the hierarchy further comprises displaying information located at all levels below the level of the first selection.

4. A method as claimed in claim 1, wherein displaying information located within the first selected part of the hierarchy further comprises displaying information located at multiple different levels.

5. A method as claimed in claim 1, further comprising receiving a second user input associated with the first representation to make a second selection of at least part of the hierarchy, at a given one of the levels in the hierarchy; and, in response to the second selection, displaying information located within the second selected part of the hierarchy, including information located two or more levels below the level of the second selection.

6. A method as claimed in claim 1, further comprising receiving a second user input associated with the second representation to make a second selection of at least part of the hierarchy, at a given one of the levels in the hierarchy; and, in response to the second selection, displaying information located within the second selected part of the hierarchy, including information located two or more levels below the level of the second selection.

7. A method of displaying hierarchically structured information, the hierarchy having at least two levels, the method comprising:

(i) displaying a first representation of at least part of the hierarchy;

(ii) receiving a first user input associated with the first representation to make a first selection of least part of the hierarchy, at a given one of the levels in the hierarchy;

(iii) in response to the first selection, displaying information located within the first selected part of the hierarchy, including information located two or more levels below the level of the first selection, wherein said information is from a fraud management system.

8. A method as claimed in claim 7, wherein displaying information located within the first selected part of the hierarchy further comprises displaying information located at all levels below the level of the first selection.

9. A method as claimed in claim 7, wherein displaying information located within the first selected part of the hierarchy further comprises displaying information located at multiple different levels.

10. A method as claimed in claim 7, further comprising receiving a second user input associated with the first representation to make a second selection of at least part of the hierarchy, at a given one of the levels in the hierarchy; and, in response to the second selection, displaying information located within the second selected part of the hierarchy, including information located two or more levels below the level of the second selection.

11. A method as claimed in claim 7, wherein at least some of the information is of different formats.

12. A method as claimed in claim 7, wherein displaying information located within the first selected part of the hierarchy comprises only displaying information of a common format.

13. A method as claimed in claim 7, further comprising displaying a second representation of at least part of the hierarchy, the second representation being independent of the first representation.

14. A method as claimed in claim 13, further comprising receiving a second user input associated with the second representation to make a second selection of at least part of the hierarchy, at a given one of the levels in the hierarchy; and, in response to the second selection, displaying information located within the second selected part of the hierarchy, including information located two or more levels below the level of the second selection.

15. A method of displaying hierarchically structured information, the hierarchy having at least two levels, the method comprising:

(i) displaying a first representation of at least part of the hierarchy;

(ii) receiving a first user input associated with the first representation to make a first selection of at least part of the hierarchy, at a given one of the levels in the hierarchy;

(iii) in response to the first selection, displaying information located within the first selected part of the hierarchy, including information located two or more levels below the level of the first selection, wherein said information comprises a plurality of alarms each of which is an indicator of potential fraud.

16. A method as claimed in claim 15, wherein displaying information located within the first selected part of the hierarchy further comprises displaying information located at all levels below the level of the first selection.

17. A method as claimed in claim 15, wherein displaying information located within the first selected part of the hierarchy further comprises displaying information located at multiple different levels.

18. A method as claimed in claim 15, further comprising receiving a second user input associated with the first representation to make a second selection of at least part of the hierarchy, at a given one of the levels in the hierarchy; and, in response to the second selection, displaying information located within the second selected part of the hierarchy, including information located two or more levels below the level of the second selection.

19. A method as claimed in claim 15, wherein at least some of the information is of different formats.

20. A method as claimed in 15, wherein displaying information located within the first selected part of the hierarchy comprises only displaying information of a common format.

21. A method as claimed in claim 15, further comprising displaying a second representation of at least part of the hierarchy, the second representation being independent of the first representation.

22. A method as claimed in claim 21, further comprising receiving a second user input associated with the second representation to make a second selection of at least part of the hierarchy, at a given one of the levels in the hierarchy; and, in response to the second selection, displaying information located within the second selected part of the hierarchy, including information located two or more levels below the level of the second selection.

23. A computer program stored on a computer readable medium, said computer program displaying hierarchically structured information, the hierarchy having at least two levels, said computer program comprising instructions operable to cause a processor to (i) display a first representation of at least part of the hierarchy;
(ii) receive a first user input associated with the first representation to make a first selection of at least part of the hierarchy at a given one of the levels in the hierarchy;
(iii) in response to the first selection, display information located within the first selected part of the hierarchy, including information located two or more levels below the level of the first selection; and
(iv) display a second representation of at least part of the hierarchy, the second representation being independent of the first representation, the second representation including at least some information having a different format than information displayed in the first representation.

24. A computer program as claimed in claim 23, wherein display information located within the first selected part of the hierarchy further comprises display information located at all levels below the level of the first selection.

25. A computer program as claimed in claim 23, wherein display information located within the first selected part of the hierarchy further comprises display information located at multiple different levels.

26. A computer program as claimed in claim 23, comprising further instructions operable to cause the processor to receive a second user input associated with the first representation to make a second selection of at least part of the hierarchy, at a given one of the levels in the hierarchy; and, in response to the second selection, display information located within the second selected part of the hierarchy, including information located two or more levels below the level of the second selection.

27. A computer program as claimed in claim 23, comprising further instructions operable to cause the processor to receive a second user input associated with the second representation of the hierarchy to make a second selection of at least part of the hierarchy, at a given one of the levels in the hierarchy; and, in response to the second selection, display information located within the second selected part of the hierarchy, including information located two or more levels below the level of the second selection.

28. A computer program as claimed in claim 23, wherein display information located within the first selected part of the hierarchy comprises only display information of a common format.

29. A fraud management system comprising:
(i) a display screen;
(ii) user input means;
(iii) a processor arranged to display information from the fraud management system on the display screen, said information comprising a plurality of alarms each alarm being an indicator of potential fraud, and wherein said alarms are hierarchically structured, the hierarchy having at least two levels, said processor being arranged to
(i) display a first representation of at least part of the hierarchy;
(ii) receive a first user input associated with the first representation to make a first selection of at least part of the hierarchy, at a given one of the levels in the hierarchy;
(iii) in response to the first selection, display information within the selected part of the hierarchy, including information about alarms located two or more levels below the level of the first selection.

30. A system as claimed in claim 29, wherein display information located within the first selected part of the hierarchy further comprises display information located at all levels below the level of the first selection.

31. A system as claimed in claim 29, wherein display information located within the first selected part of the hierarchy further comprises display information located at multiple different levels.

32. A system as claimed in claim 29, the processor being further arranged to receive a second user input associated with the first representation to make a second selection of at least part of the hierarchy, at a given one of the levels in the hierarchy; and, in response to the second selection, display information located within the second selected part of the hierarchy, including information located two or more levels below the level of the second selection.

33. A system as claimed in claim 29, wherein at least some of the information is of different formats.

34. A system as claimed in claim 29, the processor being further arranged to display a second representation of at least part of the hierarchy, the second representation being independent of the first representation.

35. A system as claimed in claim 34, the processor being further arranged to receive a second user input associated with the second representation of the hierarchy to make a second selection of at least part of the hierarchy, at a given one of the levels in the hierarchy; and, in response to the second selection, display information located within the second selected part of the hierarchy, including information located two or more levels below the level of the second selection.

36. A system as claimed in claim 29, wherein displaying information located within the first selected part of the hierarchy comprises only displaying information of a common format.

37. A graphical user interface comprising:
(i) display screen;
(ii) a user input means; and
(iii) a processor arranged to display information on the display screen, said information comprising a plurality of items each item being of a given type, said processor being arranged to
(i) form a hierarchy of said items;
(ii) display a first representation of the hierarchy on the display screen;
(iii) receive a first use input associated with the first representation to make a first selection of at least part of the hierarchy, at a given one of the levels in the hierarchy;
(iv) in response to the first selection, displaying information located within the first selected part of the hierarchy, including information located two or more levels below the level of the first selection; and
(v) displaying a second representation of at least part of the hierarchy, the second representation being independent of the first representation, the second representation including at least some information having a different format than information displayed in the first representation.

38. A graphical user interface as claimed in claim 37, wherein display information located within the first selected part of the hierarchy further comprises display information located at all levels below the level of the first selection.

39. A graphical user interface as claimed in claim 37, wherein display information located within the first selected part of the hierarchy further comprises display information located at multiple different levels.

40. A graphical user interface as claimed in claim 37, the processor being further arranged to receive a second user input associated with the first representation to make a second selection of at least part of the hierarchy, at a given one of the levels in the hierarchy; and, in response to the second selection, display information located within the second selected part of the hierarchy, including information located two or more levels below the level of the second selection.

41. A graphical user interface as claimed in claim 37, the processor being further arranged to receive a second user input associated with the second representation of the hierarchy to make a second selection of at least part of the hierarchy, at a given one of the levels in the hierarchy; and, in response to the second selection, display information located within the second selected part of the hierarchy, including information located two or more levels below the level of the second selection.

42. A graphical user interface as claimed in claim 37, wherein display information located within the first selected part of the hierarchy comprises only display information of a common format.

43. A method of operating a display for displaying hierarchically structured information, the hierarchy having at least two levels, said method comprising (i) causing a first representation of at least part of the hierarchy to be displayed;

(ii) making a user enter a first input associated with the first representation to select at least part of the hierarchy at a given one of the levels of the hierarchy;

(iii) in response to the first selection, causing information to be displayed within the first selected part of the hierarchy, including information located two or more levels below the level of the first selection; and (iv) causing a second representation of at least part of the hierarchy to be displayed, the second representation being independent of the first representation, the second representation including at least some information having a different format than information displayed in the first representation.

44. A method as claimed in claim 43, wherein causing information to be displayed within the first selected part of the hierarchy further comprises causing information located at all levels below the level of the first selection to be displayed.

45. A method as claimed in claim 43, wherein causing information to be displayed within the first selected part of the hierarchy further comprises causing information located at multiple different levels to be displayed.

46. A method as claimed in claim 43, further comprising making a user enter a second input associated with the first representation to make a second selection of at least part of the hierarchy, at a given one of the levels in the hierarchy; and, in response to the second selection, causing information to be displayed within the second selected part of the hierarchy, including information located two or more levels below the level of the second selection.

47. A method as claimed in 43, wherein causing information to be displayed within the first selected part of the hierarchy comprises causing only information of a common format to be displayed.

48. A method as claimed in claim 43, further comprising making a user enter a second input associated with the second representation to make a second selection of at least part of the hierarchy, at a given one of the levels in the hierarchy; and, in response to the second selection, causing information located within the second selected part of the hierarchy to be displayed, including information located two or more levels below the level of the second selection.

* * * * *

UNITED STATES PATENT AND TRADEMARK OFFICE
CERTIFICATE OF CORRECTION

PATENT NO. : 6,437,812 B1
DATED : August 20, 2002
INVENTOR(S) : Giles et al.

It is certified that error appears in the above-identified patent and that said Letters Patent is hereby corrected as shown below:

<u>Title page,</u>
Item [75], replace "Jonathan Coward" with -- Jon Hope --

<u>Column 14,</u>
Line 39, before "display" add -- a --

Signed and Sealed this

Seventeenth Day of December, 2002

JAMES E. ROGAN
*Director of the United States Patent and Trademark Office*